United States Patent
Bouille et al.

(10) Patent No.: US 6,483,216 B2
(45) Date of Patent: Nov. 19, 2002

(54) DAMPER SYSTEM AND BEARING CENTERING DEVICE FOR MAGNETIC BEARING VACUUM PUMP

(75) Inventors: André Bouille, Annecy (FR); Jean-Emile Chollet, Archamps (FR)

(73) Assignee: Alcatel, Paris (FR)

(*) Notice: Subject to any disclaimer, the term of this patent is extended or adjusted under 35 U.S.C. 154(b) by 3 days.

(21) Appl. No.: 09/770,660

(22) Filed: Jan. 29, 2001

(65) Prior Publication Data

US 2001/0010438 A1 Aug. 2, 2001

(30) Foreign Application Priority Data

Jan. 31, 2000 (FR) .............................. 00 01173

(51) Int. Cl.[7] .............. H02K 7/08; H02K 7/09; F16C 32/00
(52) U.S. Cl. .............. 310/90.5; 310/90; 417/427; 417/423.4
(58) Field of Search .............. 310/90.5, 90; 384/584, 384/582; H02K 7/09, 7/08; F16C 32/00, 32/04

(56) References Cited

U.S. PATENT DOCUMENTS

| | | | | | |
|---|---|---|---|---|---|
| 5,209,631 A | * | 5/1993 | Bernhardt | .............. | 415/90 |
| 5,747,907 A | * | 5/1998 | Miller | .............. | 310/90 |
| 6,050,782 A | * | 4/2000 | Lembke | .............. | 417/205 |
| 6,078,120 A | * | 6/2000 | Casaro | .............. | 310/90 |

FOREIGN PATENT DOCUMENTS

| | | |
|---|---|---|
| DE | 89 10 040.9 U | 1/1990 |
| DE | 38 34 271 A1 | 4/1990 |
| DE | 0 768 467 A1 | 4/1997 |
| EP | 0 220 581 A1 | 5/1987 |
| FR | 2 614 375 A1 | 10/1988 |
| GB | 1 243 234 A | 8/1971 |
| JP | 07-103231 * | 4/1995 .......... F16C/32/00 |

* cited by examiner

Primary Examiner—Nestor Ramirez
Assistant Examiner—Iraj A Mohandesi
(74) Attorney, Agent, or Firm—Sughrue Mion, PLLC

(57) ABSTRACT

In a vacuum pump according to the invention, the rotor is held inside the stator by radial magnetic bearings, and its radial movements are limited by one or more landing mechanical bearings each made up of a rotor rolling bearing race and a stator rolling bearing race. At least one coaxial ring of elastomer in the shape of a torus is inserted between the outside peripheral surface of the stator rolling bearing race and the stator itself to constitute a damped elastic connection which significantly increases the reliability and the service life of the landing mechanical bearing.

10 Claims, 3 Drawing Sheets

DAMPER SYSTEM AND BEARING CENTERING DEVICE FOR MAGNETIC BEARING VACUUM PUMP

BACKGROUND OF THE INVENTION

1. Field of the Invention

The present invention relates to the suspension of the rotors of vacuum pumps.

2. Description of the Prior Art

In vacuum pumps, a rotor that rotates inside a stator is held by magnetic bearings which, in normal operation, hold the rotor inside the stator in a centered radial position to within a centered normal holding accuracy and with no mechanical contact between the rotor and the stator. The magnetic bearings include electromagnets supplied with electrical energy by appropriate circuits controlling the radial position of the rotor inside the stator.

The effectiveness with which the rotor is held radially inside the stator is determined by the force of the electromagnets, and holding the rotor necessitates supplying the electromagnets with sufficient electrical energy.

Failure or insufficient normal operation of the magnetic bearings can sometimes occur. Failure occurs in the event of an interruption to the electrical power supply of the electromagnets, for example. In this case, the magnetic bearings no longer exercise the rotor centering function, and there follows a "landing" phase during which the rotor passes from a state of being held with no mechanical contact to a state of being held by virtue of mechanical contact. During the landing phase, the rotor tends to come into contact with the stator. Because of the very high rotation speed of the rotor, which is of the order of 30,000 rpm, for example, such contact can destroy the vacuum pump.

Failure can equally occur in the event of a sudden and large load on the rotor. The sudden load may cause decentering of the rotor inside the stator, leading to contact and bouncing. This can lead to loss of control of the position of the rotor by the sensors and magnets of the magnetic bearings, and the safety system then issues a stop instruction which stops the pump.

To solve the problem of mechanically holding the rotor during the landing phase, vacuum pumps have already been fitted with secondary landing mechanical rolling bearings which, failing normal operation of the magnetic bearings, limit radial displacements of the rotor inside the stator by approximately centering the rotor and limiting radial movement of the rotor to a value less than the airgap of the magnetic bearings. It has also been proposed to incorporate in the landing mechanical bearing a rolling bearing having elastic means and damper means to limit vibration of the rotor during the landing phase, as described in the document FR 2 614 375 A. The solution described in FR 2 614 375 A consists of inserting a corrugated metal blade into an annular space between the stator and the facing rolling bearing race.

It has been found that this disposition increases the service life of the bearings.

However, the number of landing phases that can occur without significant deterioration of the mechanical bearings is still limited, which reduces the reliability of the vacuum pump and increases the frequency of maintenance operations. The device would not appear to be effective enough to prevent unscheduled stopping of the pump.

There is a need to increase the number of landing phases that can occur and the service life of the landing mechanical rolling bearings.

Also, in prior art devices, there is a risk of the bearings binding. If the bearings bind when the rotor is still turning at high speed, the vacuum pump is almost certain to be destroyed.

Assembling and demounting a corrugated blade bearing are also relatively delicate and difficult operations, as they require the use of dedicated, non-standard tools, take a relatively long time and require qualified and experienced personnel. This increases production and maintenance costs and makes it obligatory to assemble the bearing complete with its corrugated blade before inserting the rotor into the stator.

Accordingly, the problem addressed by the present invention is that of designing a new structure of landing mechanical rolling bearing, which prevents unscheduled stopping of the pump due to loss of control over the position of the rotor by the magnetic bearings, and which has an increased service life to allow a greater number of landing phases or a greater time between failures by reducing the risk of binding.

Another object of the invention is to facilitate assembling and demounting the bearings in order to reduce production and maintenance costs.

The present invention stems from the observation that some defects of reliability of landing mechanical rolling bearings are in fact due to the presence of the corrugated blades in the prior art devices. In normal operation of magnetic bearings, the rolling bearings of the landing mechanical bearings are stationary and fastened to the stator; on interruption of the operation of the magnetic bearings, the rotor comes into contact with the inside races of the landing mechanical bearings, and entrains in rotation the inner races of the rolling bearings and the rolling means disposed between the two races; due to the rapid rotation of the rotor, a rotation torque is applied to the outer race of the rolling bearings and to the corrugated blade; friction between the corrugated blade and the stator is insufficient to brake the rotation of the outer rolling bearing race sufficiently. The high speed and large amplitude of the rotation of the outer rolling bearing race and the corrugated blade wear the walls of the housing containing them, which increases play and progressively reduces the effectiveness of the device; friction between the various parts also runs the risk of producing chips or filings with the risk of jamming the rolling means of the mechanical bearing.

Accordingly, the invention aims to eliminate the use of corrugated blades, and at the same time to eliminate the risks that can result from the entrainment in rotation of the outer rolling bearing races of landing mechanical bearings.

The invention also stems from the observation that unscheduled stopping of pumps is due to insufficient damping of the corrugated blades, with the result that it is not possible to suppress radial rebound of the rotor inside the stator.

Accordingly, the invention aims to increase the damping capacities of the landing mechanical bearing.

SUMMARY OF THE INVENTION

To achieve the above and other objects, the invention provides a vacuum pump having a rotor adapted to rotate inside a stator, having at least one radial magnetic bearing which, in normal operation, holds the rotor in a centered radial position inside the stator to within a centered normal holding accuracy, and having at least one landing mechanical bearing which, if the radial magnetic bearings are not operating normally, limits radial movements of the rotor inside the stator by approximately centering the rotor, the landing mechanical bearing having a rotor rolling bearing race and a stator rolling bearing race with rolling members between them, a first radial clearance being provided between a first of the rotor or stator rolling bearing races and a corresponding first rotor or stator bearing surface, a second radial clearance being provided between the second of the rotor or stator rolling bearing races and a corresponding second rotor or stator bearing surface, elastic means and damping means with mechanical abutment means being provided between the second of the rotor or stator rolling bearing races and the corresponding second rotor or stator bearing surface to limit the second radial clearance; according to the invention, said elastic means and damper means include at least one coaxial ring of elastic and damping material in radial bearing engagement between the second of the rotor or stator rolling bearing races and the corresponding second rotor or stator bearing surface.

The at least one coaxial ring of elastic and damping material comes simultaneously into contact with the second of the stator and rotor rolling bearing races and into contact with the corresponding rotor or stator.

The at least one coaxial ring of elastic and damping material is preferably precompressed radially between the second of the rotor or stator rolling bearing races and the corresponding second rotor or stator bearing surface.

The coaxial ring of elastic and damping material is advantageously precompressed by attached axial compression means, which therefore determine the radial precompression and enable it to be adjusted and adapted to suit the conditions of use.

In one advantageous embodiment, said attached axial compression means include at least one attached wedge fixed to the rotor or the stator corresponding to said second stator rolling bearing race and bearing axially on the front edge surface of the coaxial ring of elastic and damping material.

Said attached wedge advantageously also assures the function of a mechanical abutment limiting the second radial clearance.

The invention can be applied to a landing mechanical bearing in which said elastic means include a single coaxial ring of elastic and damping material. However, said elastic means can advantageously include, for holding the rolling bearing of a landing mechanical bearing, two identical and coaxial rings of elastic and damping material offset axially relative to each other, for example either in contact with each other, or separated by a coaxial bush.

In accordance with the invention, the rotor of the vacuum pump can be held radially by a magnetic bearing associated with a landing rolling bearing according to the invention. Nevertheless, the rotor can advantageously be held radially by at least two radial magnetic bearings and by at least two landing mechanical rolling bearings each having elastic means with a coaxial ring of elastic and damping material as defined above.

In an advantageous embodiment of the invention, the first radial clearance is between the rotor and the rotor rolling bearing race, and the second radial clearance is between the stator and the stator rolling bearing race with radial interposition of the coaxial ring(s) of elastic and damping material.

Other objects, features and advantages of the present invention will emerge from the following description of particular embodiments of the invention, which description is given with reference to the accompanying drawings.

DETAILED DESCRIPTION OF THE PREFERRED EMBODIMENTS

Figure 1:
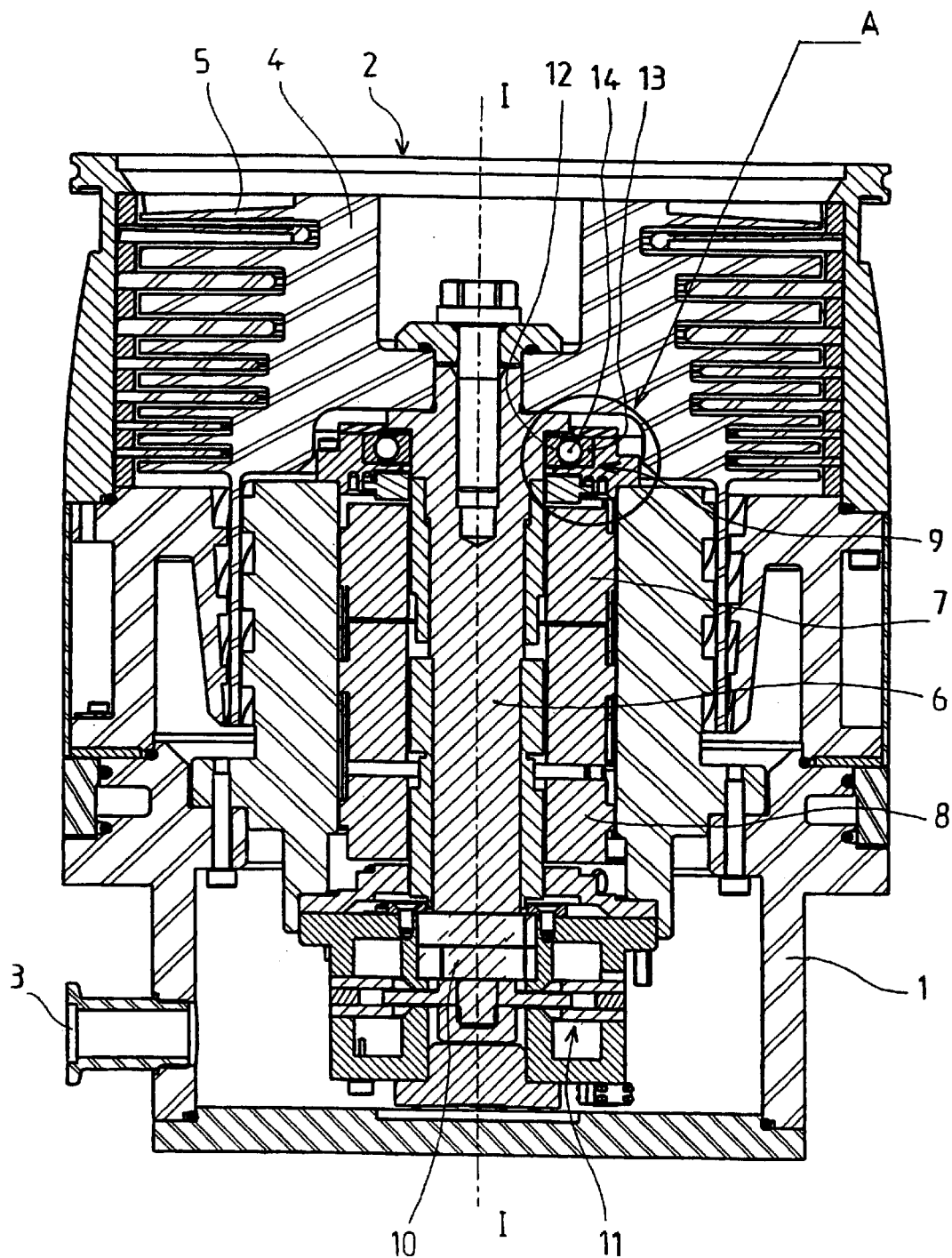
FIG. 1 is a general view in longitudinal section of a vacuum pump whose rotor is held by magnetic bearings and by associated landing mechanical bearings.

In the FIG. 1 embodiment, a vacuum pump generally includes a stator 1 having an axial suction inlet 2 and a radial discharge outlet 3. A rotor 4 rotates axially inside the stator 1 about a longitudinal axis I—I. The rotor 4 includes a suction system illustrated by vanes 5, and a shaft 6 journaled in bearings of the stator 1. The FIGURE shows two radial magnetic bearings 7 and 8, and two radially acting landing mechanical rolling bearings 9 and 10. There is also an axial magnetic bearing 11.

In normal operation, i.e. with no excessive load on the shaft 6 of the pump and with the magnetic bearings operating normally, the magnetic bearings hold the rotor 4 centered in the correct axial position, and the landing mechanical bearings 9 and 10 do not touch the shaft 6.

The landing mechanical bearing 9 includes a rotor rolling bearing race 12, near and around the shaft 6 of the rotor 4, and a stator rolling bearing race 13 near the stator 1. Rolling members such as balls 14, needle rollers or any other type of rolling members known in the art, are disposed between the rotor rolling bearing race 12 and the stator rolling bearing race 13, to constitute a bearing allowing relative axial rotation of the two rolling bearing races 12 and 13.

Figure 2:
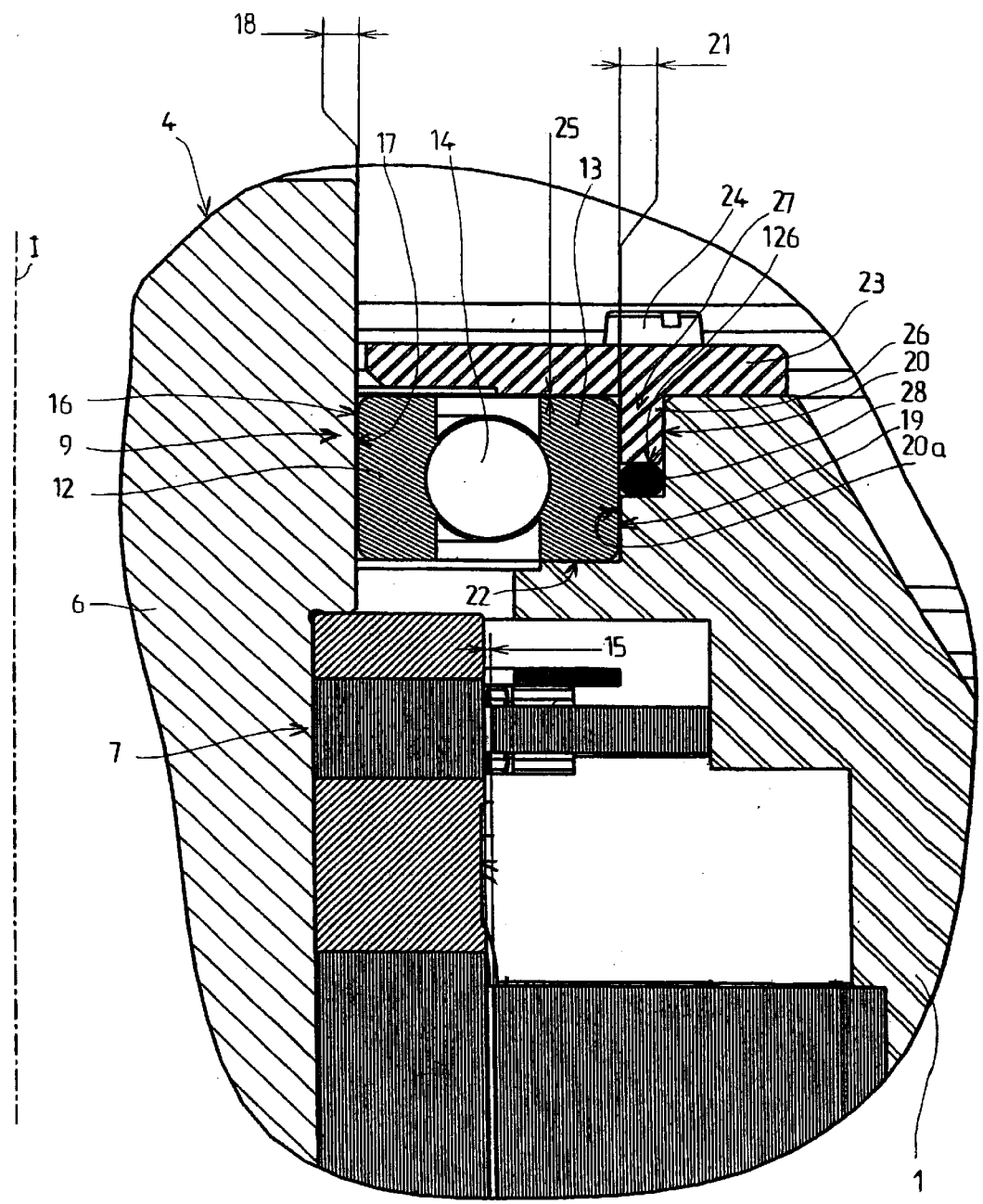
FIG. 2 is an enlarged view in section of the area A of FIG. 1, showing a landing mechanical rolling half-bearing constituting a first embodiment of the present invention.

Refer now to FIG. 2, which shows in more detail and to a larger scale the landing mechanical half-bearing 9 between the shaft 6 of the rotor 4 and a corresponding portion of the stator 1. It shows the rolling member 14 between the rotor rolling bearing race 12 and the stator rolling bearing race 13. It also shows the radial magnetic bearing 7 which, in normal operation, centers the shaft 6 of the rotor 4 inside the stator 1 to leave an annular airgap 15 defining the maximum radial clearance for the shaft 6 inside the stator 1. Under normal conditions, the airgap 15 can be from approximately 0.2 mm to approximately 0.4 mm wide, for example. The object of the landing mechanical bearing 9 is to reduce the possibility of axial displacement of the shaft 6 of the rotor 4 inside the stator 1 to a value significantly less than the airgap 15 to prevent damage to the magnetic bearings in the event of a landing.

Between the inside annular face 16 of the rotor rolling bearing race 12 and a corresponding first bearing surface 17 of the rotor 4, there is a first radial clearance 18 which is clearly smaller than the airgap 15 but only slightly greater than the accuracy to within which the rotor 4 is normally centered by the magnetic bearing(s) 7. The accuracy to within which the rotor 4 is normally held centered is generally very good, less than a few microns. In the same way, there is a second radial clearance 21, i.e. a radial distance by which the stator rolling bearing race 13 can move inside the stator 1 between the outside peripheral annular face 19 of the stator rolling bearing race 13 and a corresponding second bearing surface 20 of the stator 1.

The stator rolling bearing race 13 is engaged in a housing in the front of the stator 1 between an axial shoulder 22 and an attached fixing ring 23 secured to the stator 1 by screws whose head 24 can be seen. A small axial clearance 25 is preferably left between the attached fixing ring 23 and the outside front face of the stator rolling bearing race 13.

The attached fixing ring 23 has a coaxial cylindrical annular rib 26 which is engaged axially in an annular housing 27 between the stator 1 and the stator rolling bearing race 13. A coaxial ring 28 of an elastic and damping material, for example an elastomer, is placed in the housing 27, and lies radially between the stator rolling bearing race 13 and the corresponding second stator bearing surface 20, and pressing radially against both the stator rolling bearing race 13 and said second stator bearing surface 20.

In the embodiment shown, the coaxial ring 28 of elastic and damping material, such as an elastomer, is in the shape of a torus and is compressed axially between the coaxial cylindrical annular rib 26 of the attached fixing ring 23 and the bottom of the housing 27, causing the elastomer coaxial radial ring 28 to expand radially which press simultaneously against the outside peripheral annular face 19 of the stator rolling bearing race 13 and against the second bearing surface 20 of the stator 1.

In the device shown in FIG. 2, the shape of the housing 27 is such that the elastomer coaxial ring 28 is substantially halfway along the axial length of the landing mechanical bearing 9. The first and second bearing surfaces 17 and 20 are coaxial and cylindrical. Alternatively, similar structures in accordance with the invention could be designed with conical bearing surfaces 17 and 20.

The coaxial cylindrical annular rib 26 constitutes an attached wedge which is fixed to the stator 1 and an end annular surface 126 of which bears axially on the front edge face of the elastomer coaxial ring 28. This end annular surface 126 can be a flat transverse ring, as shown in the FIGURES. Alternately, to modulate the resulting radial compression of the elastomer coaxial ring 28, the end annular surface can be conical, inclined to the right or to the left, angular convex or concave, curved convex or concave.

In these embodiments, said attached wedge constituted by the coaxial cylindrical annular rib 26 also provides the function of a mechanical abutment to limit the second radial clearance 21, its radial thickness being greater than or equal to the radial thickness of the housing 27. In this way, over and above the capacity for elastic deformation of the elastomer coaxial ring 28, the stator rolling bearing race 13 bears radially against the front cylindrical ring 26.

In the event of a landing, operation is as follows: initially the rotor rolling bearing race 12 does not touch the shaft 6, which is turning at high speed about its axis I—I. When the radial magnetic bearings, such as the bearing 7, cease to operate, the rotor 4 can move radially by virtue of the first radial clearance 18 until it comes into contact with the rotor rolling bearing race 12 which is then entrained in rotation and entrains also in rotation the bearing member 14. In contrast to what happens in the prior art corrugated blade device, rotation of the stator rolling bearing race 13 is braked by the friction produced by the precompressed elastomer coaxial ring 28. This prevents all risk of wear caused by rubbing of the stator rolling bearing race 13 against the stator 1 and against the attached fixing ring 23. Thus, the elastomer coaxial ring 28 has a first function of braking rotation of the stator rolling bearing race 13, preventing damage by wear and the risks of binding of the rolling bearing. At the same time, by virtue of its capacity for radial elastic compression, the elastomer coaxial ring 28 allows radial movement of the stator rolling bearing race 13, and therefore of the shaft 6 of the rotor 4, because of the second radial clearance 21, until it abuts against the coaxial cylindrical annular rib 26 and/or against a coaxial cylindrical bearing surface 20a of the stator 1, whilst also providing a damped elastic connection. By virtue of the properties of the elastic and damping material constituting the coaxial ring 28, which the skilled person can choose without difficulty, the damping effect can be very much greater than that obtained in the prior art corrugated blade device. Good results have been obtained using elastomer coaxial rings 28 with a Shore hardness in the range from 50 to 90, although other values may be suitable, depending on the applications.

Figure 3:
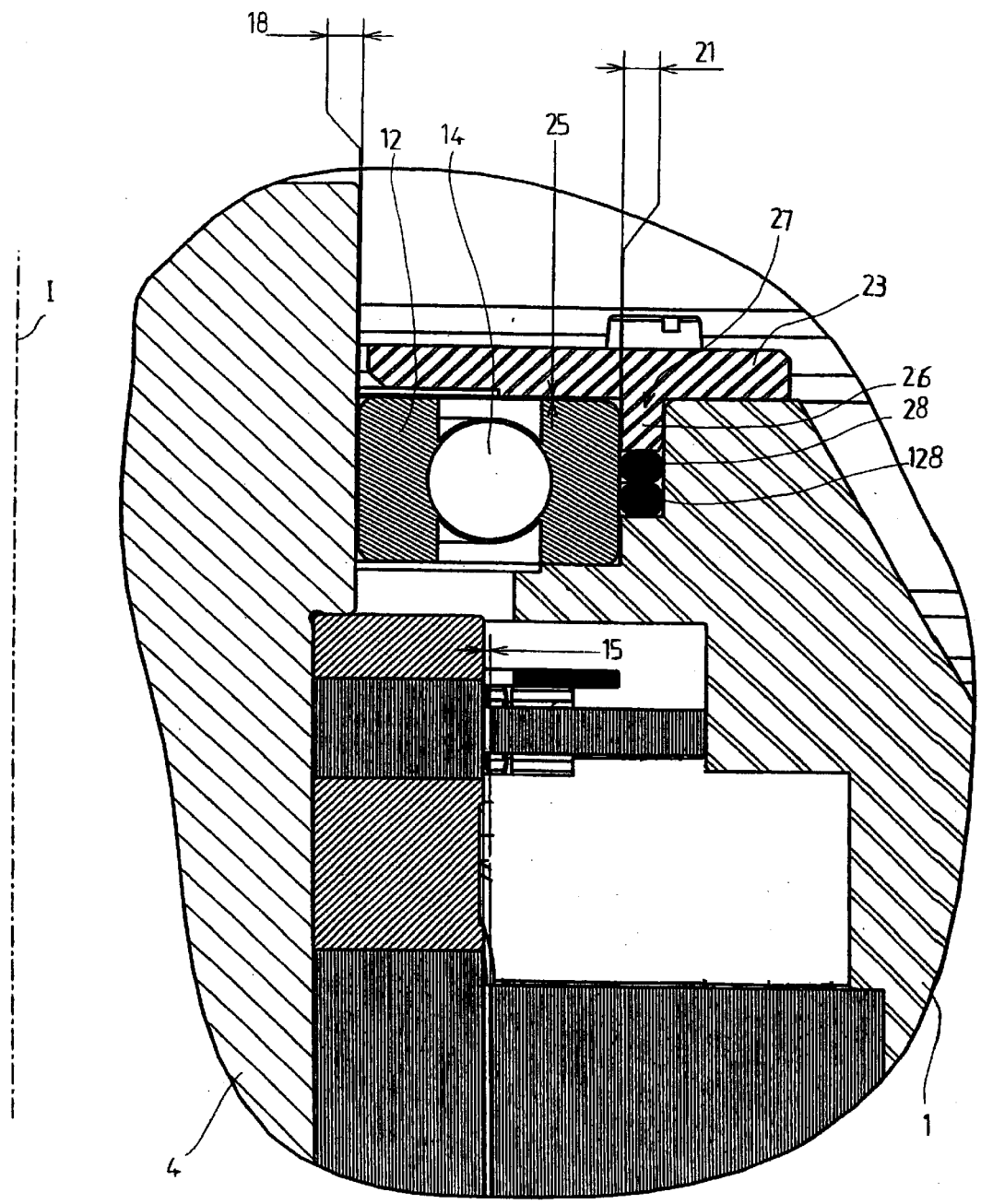
FIG. 3 is an enlarged view in section of the area A showing a landing mechanical rolling half-bearing constituting a second embodiment of the present invention.

In the second embodiment shown in FIG. 3, the components are substantially the same as in the FIG. 2 embodiment, with the same shapes and the same functions, and these are identified by the same reference numbers.

The only difference lies in the fact that, in the housing 27, there are two identical coaxial rings 28 and 128 of an elastic and damping material, for example an elastomer, offset axially relative to each other.

The present invention is not limited to the embodiments that have just been described explicitly but encompasses variants and generalizations thereof that will be evident to the skilled person.

What is claimed is:

1. A vacuum pump having a rotor adapted to rotate inside a stator, having at least one radial magnetic bearing which, in normal operation, holds said rotor in a centered radial position inside said stator to within a centered normal holding accuracy, and having at least one landing mechanical bearing which, if said radial magnetic bearings are not operating normally, limits radial movements of said rotor inside said stator by approximately centering said rotor, said landing mechanical bearing having a rotor rolling bearing race and a stator rolling bearing race with rolling members between them, a first radial clearance being provided between a first of said rotor or stator rolling bearing races and a corresponding first rotor or stator bearing surface, a second radial clearance being provided between the second of said rotor or stator rolling bearing races and a corresponding second rotor or stator bearing surface, elastic means and damping means with mechanical abutment means being provided between said second of said rotor or stator rolling bearing races and said corresponding second rotor or stator bearing surface to limit said second radial clearance, which elastic means and damper means include at least one coaxial ring of elastic and damping material in radial bearing engagement between said second of said rotor or stator rolling bearing races and said corresponding second rotor or stator bearing surface.

2. The vacuum pump claimed in claim 1 wherein said at least one coaxial ring of elastic and damping material is precompressed radially between said second of said rotor or stator rolling bearing races and said corresponding second rotor or stator bearing surface.

3. A vacuum pump having a rotor adapted to rotate inside a stator, having at least one radial magnetic bearing which, in normal operation, holds said rotor in a centered radial position inside said stator to within a centered normal holding accuracy, and having at least one landing mechanical bearing which, if said radial magnetic bearings are not operating normally, limits radial movements of said rotor inside said stator by approximately centering said rotor, said landing mechanical bearing having a rotor rolling bearing race and a stator rolling bearing race with rolling members between them, a first radial clearance being provided between a first of said rotor or stator rolling bearing races and a corresponding first rotor or stator bearing surface, a second radial clearance being provided between the second of said rotor or stator rolling bearing races and a corresponding second rotor or stator bearing surface, elastic means and damping means with mechanical abutment means being provided between said second of said rotor or stator rolling bearing races and said corresponding second rotor or stator bearing surface to limit said second radial clearance, which elastic means and damper means include at least one coaxial ring of elastic and damping material in radial bearing engagement between said second of said rotor or stator rolling bearing races and said corresponding second rotor or stator bearing surface, wherein said at least one coaxial ring of elastic and damping material is loaded by attached axial compression means which determine its radial precompression.

4. The vacuum pump claimed in claim 3 wherein said attached axial compression means include at least one attached wedge fixed to said rotor or said stator corresponding to said second stator rolling bearing race and bearing axially on said front edge surface of said coaxial ring of elastic and damping material.

5. The vacuum pump claimed in claim 4 wherein said attached wedge also assures the function of a mechanical abutment limiting said second radial clearance.

6. The vacuum pump claimed in claim 1 wherein said elastic means include two identical coaxial rings of elastic and damping material offset axially relative to each other for holding a landing mechanical rolling bearing.

7. The vacuum pump claimed in claim 1 wherein said rotor is held radially by at least two radial magnetic bearings and by at least two landing mechanical rolling bearings each provided with elastic means including a coaxial ring of elastic and damping material.

8. A vacuum pump having a rotor adapted to rotate inside a stator, having at least one radial magnetic bearing which, m normal operation, holds said rotor in a centered radial position inside said stator to within a centered normal holding accuracy, and having at least one landing mechanical bearing which, if said radial magnetic bearings are not operating normally, limits radial movements of said rotor inside said stator by approximately centering said rotor, said landing mechanical bearing having a rotor rolling bearing race and a stator rolling be race with rolling members between them, a first radial clearance being provided between a first of said rotor or stator rolling bearing races and a corresponding first rotor or stator bearing surface, a second radial clearance being provided between the second of said rotor or stator rolling bearing races and a corresponding second rotor or stator bearing surface, elastic means and damping team with mechanical abutment means being provided between said second of said rotor or stator rolling bearing races and said corresponding second rotor or stator bearing surface to limit said second radial clearance, which elastic means and damper means include at least one coaxial ring of elastic and damping material in radial bearing engagement between said second of said rotor or stator rolling bearing races and said corresponding second rotor or stator bearing surface, wherein said first radial clearance is between said rotor and said rotor rolling bearing race, and said second radial clearance is between said stator and said stator rolling bearing race with said coaxial ring(s) of elastic and damping material disposed radially between them.

9. The vacuum pump claimed in claim 1 wherein said at least one coaxial ring of elastic and damping material is in the shape of a torus.

10. The vacuum pump claimed in claim 1 wherein the elastic and damping material of said at least one coaxial ring is made of elastomer.

* * * * *